US012131724B1

(12) United States Patent
Guo et al.

(10) Patent No.: US 12,131,724 B1
(45) Date of Patent: Oct. 29, 2024

(54) METHOD AND SYSTEM FOR ACHIEVING BLE MIDI CONTROLLER INSTRUCTION CONTROL BASED ON VIRTUAL MIDI PORT

(71) Applicant: Zhuhai Sinco Intelligent Technology Co., Ltd., Guangdong (CN)

(72) Inventors: Jian Guo, Zhuhai (CN); Chaowen Tan, Zhuhai (CN)

(73) Assignee: Zhuhai Sinco Intelligent Technology Co., Ltd., Zhuhai (CN)

( * ) Notice: Subject to any disclaimer, the term of this patent is extended or adjusted under 35 U.S.C. 154(b) by 0 days.

(21) Appl. No.: 18/754,099

(22) Filed: Jun. 25, 2024

(30) Foreign Application Priority Data

Sep. 12, 2023 (CN) ......................... 202311170445.X

(51) Int. Cl.
*G10H 1/00* (2006.01)

(52) U.S. Cl.
CPC ......... *G10H 1/0066* (2013.01); *G10H 1/0083* (2013.01); *G10H 2240/321* (2013.01)

(58) Field of Classification Search
CPC ............... G10H 1/0066; G10H 1/0083; G10H 2240/321
See application file for complete search history.

(56) References Cited

U.S. PATENT DOCUMENTS 7,915,514 B1 * 3/2011 Shrem .................. G10H 1/0075 84/645
2009/0254924 A1 10/2009 Anirudh et al.
2011/0145815 A1 6/2011 Zou et al.
2011/0174138 A1 7/2011 Loh et al.
2012/0259612 A1 * 10/2012 Lyons ..................... G06F 3/162 703/21
2013/0087037 A1 * 4/2013 Dreher ..................... G10H 1/46 84/645
(Continued)

FOREIGN PATENT DOCUMENTS

CN 101030334 A 9/2007
CN 101046953 A 10/2007
(Continued)

*Primary Examiner* — Jeffrey Donels
(74) *Attorney, Agent, or Firm* — Rondaus PLLC; George Liu

(57) ABSTRACT

The present disclosure discloses a method and system for achieving BLE MIDI controller instruction control based on a virtual MIDI port, comprising: carrying out the port simulation on an operation system, and creating a plurality of virtual MIDI ports; when it is detected that a BLE MIDI controller is connected to the operation system, the virtual MIDI ports is automatically allocated to a connected BLE MIDI controller, and a connection state of the BLE MIDI controller is detected in real time; the BLE MIDI controller encapsulates a normal MIDI messages to be sent out and a corresponding virtual MIDI port in a sysex exclusive messages to obtain a corresponding functional sysex exclusive messages, and sends the functional sysex exclusive messages to a decoder. According to the BLE MIDI controller, the purposes of the present disclosure effectively solving data conflicts and expanding the action range of the BLE MIDI controller are achieved.

8 Claims, 3 Drawing Sheets

(56) References Cited

U.S. PATENT DOCUMENTS

| | | | | |
|---|---|---|---|---|
| 2015/0255053 | A1* | 9/2015 | Nelson | G10H 1/0083 84/645 |
| 2016/0140943 | A1* | 5/2016 | Valladares-Madrid | G10H 1/0066 84/645 |
| 2018/0006870 | A1* | 1/2018 | McChord | H04L 41/0806 |

FOREIGN PATENT DOCUMENTS

| | | | | |
|---|---|---|---|---|
| CN | 102413887 | A | 4/2012 | |
| CN | 109407854 | A | 3/2019 | |
| CN | 109559719 | A | 4/2019 | |
| CN | 113497661 | A | 10/2021 | |
| CN | 113642869 | A | 11/2021 | |
| CN | 114898727 | A | 8/2022 | |
| WO | WO-2006078596 | A1 * | 7/2006 | G10H 1/0066 |
| WO | 2008008418 | A2 | 1/2008 | |

* cited by examiner

METHOD AND SYSTEM FOR ACHIEVING BLE MIDI CONTROLLER INSTRUCTION CONTROL BASED ON VIRTUAL MIDI PORT

TECHNICAL FIELD

The present disclosure herein relates to the technical field of Bluetooth Low Energe Musical Instrument Digital Interface (BLE MIDI) controllers, specifically to a method and system for achieving BLE MIDI controller instruction control based on a virtual Musical Instrument Digital Interface (MIDI) port.

BACKGROUND

Since the 1980s, MIDI has become a universal standard and has been adopted by all mainstream instrument and device manufacturers. Therefore, MIDI plays a crucial role in the music industry. MIDI controller is a physical, hand operated interface that plays and controls hardware and software through MIDI Messages. The MIDI controller interconnects with other instruments and software by sending and receiving MIDI messages. MIDI messages are a set of messages that trigger other resources and make them sound or perform operations.

MIDI controllers have been widely adopted in the fields of digital music production and live performances. Traditional wired MIDI controllers, due to their mostly wired connection mode, can extract multiple ports in the operation system to send out MIDI messages separately, thereby avoiding data conflicts and making music production smoother. The interaction between the wired MIDI controller and the operation system is shown in FIG. 1. In recent years, the emergence of BLE MIDI technology has provided artists and music producers with wireless degrees of freedom. The interaction between BLE MIDI controllers and operation systems is shown in FIG. 2. However, on the other hand, it also brings about port restrictions, as follows:

(1) In wireless mode, the BLE MIDI controller cannot enumerate multiple ports, and MIDI messages are prone to conflicts, resulting in unsatisfactory effects in the fields of music production and live performance.

(2) In wireless mode, the BLE MIDI controller cannot perform and control simultaneously, which greatly limits the scope of the BLE MIDI controller.

SUMMARY

In order to overcome the shortcomings of existing technologies, the present disclosure provides a method and system for achieving BLE MIDI controller instruction control based on a virtual MIDI port, which is used to solve the technical problems of MIDI messages conflicts and inability to perform and control simultaneously in wireless mode of BLE MIDI controllers, thereby effectively solving data conflicts and expanding the action range of the BLE MIDI controller.

To solve the above problems, the technical solution adopted by the present disclosure is as follows:

a method for achieving BLE MIDI controller instruction control based on a virtual MIDI port, and the method comprising the following steps:

carrying out a port simulation on an operation system, and creating a plurality of virtual MIDI ports;

when it is detected that a BLE MIDI controller is connected to the operation system, the virtual MIDI port is automatically allocated to a connected BLE MIDI controller, and a connection state of the BLE MIDI controller is detected in real time;

the BLE MIDI controller encapsulates a normal MIDI messages to be sent out and a corresponding virtual MIDI port in a System Exclusive Messages (sysex exclusive messages) to obtain a corresponding functional sysex exclusive messages, and sends the functional sysex exclusive messages to a decoder; and the received function sysex exclusive messages is converted into the normal MIDI messages in real time through the decoder, and then the normal MIDI messages is immediately sent to the operation system through the corresponding virtual MIDI port, so that the instruction control of the BLE MIDI controller is completed.

As a preferred embodiment of the present disclosure, when carrying out the port simulation on the operation system, including:

connecting different BLE MIDI controllers to the operation system and obtaining a Media Access Control (MAC) addresses of the different BLE MIDI controllers through the operation system.

As a preferred embodiment of the present disclosure, when creating a plurality of virtual MIDI ports, comprising:

creating corresponding virtual MIDI ports based on the existing virtual MIDI ports driver of the operation system and the MAC address;

alternatively, based on the MAC address, creating corresponding virtual MIDI ports on the operation system through an API;

after creating the corresponding virtual MIDI ports, including:

establishing a MAC address list between each virtual MIDI port and its corresponding MIDI messages, and the MAC address.

As a preferred embodiment of the present disclosure, when the virtual MIDI port is automatically allocated to the connected BLE MIDI controller, including:

automatically allocate one or more virtual MIDI ports to the BLE MIDI controller based on the MAC address of the connected BLE MIDI controller;

wherein, when automatically allocating based on the MAC addresses, including:

obtaining the MAC address of the BLE MIDI controller and determining whether the MAC address is included in the MAC address list;

if so, obtain the corresponding virtual MIDI ports on the MAC address from the MAC address list and allocate it;

if not, prompt user to carry out the port simulation on the connected BLE MIDI controller, create the corresponding virtual MIDI ports, and update the MAC address list.

As a preferred embodiment of the present disclosure, when the connection state of the BLE MIDI controller is detected in real time, including:

obtaining a plurality of heartbeat packets data of the connected BLE MIDI controller within a neighborhood time period at a current time, each of the heartbeat packets data contains a time information of the BLE MIDI controller and an operation state information of the BLE MIDI controller;

the connection state of the BLE MIDI controller is detected in real time based on the time information of the BLE MIDI controller and the operation state information of the BLE MIDI controller;

wherein, the neighborhood time period contains two receiving moments, and the time information of the BLE MIDI controller includes a device time of the BLE MIDI controller.

As a preferred embodiment of the present disclosure, when real time detection is performed based on the two reception times, including:

obtaining the time information of the BLE MIDI controller and the operation state information of the BLE MIDI controller in the heartbeat packets data corresponding to the two receiving moments, further obtaining a difference between the device time of the BLE MIDI controller corresponding to the two receiving moments, and recording it as a first difference;

obtaining a difference between the device time of the BLE MIDI controller in a target heartbeat packets data and the current time in a time zone where the BLE MIDI controller is located, and recording it as a second difference; and the connection state of the BLE MIDI controller is detected in real time based on the first difference, the second difference, and the operation state information of the BLE MIDI controller in the target heartbeat packets data.

As a preferred embodiment of the present disclosure, when real time detection is carried out based on the target heartbeat packets data, including:

determining whether the BLE MIDI controller is operating normally based on the operation state information of the BLE MIDI controller in the target heartbeat packets data;

if not, it is considered that the BLE MIDI controller is in an offline state; and if so, further determine whether the first difference and the second difference are both less than a preset time difference; if so, it is considered that the BLE MIDI controller is in the online state; if not, it is considered that the BLE MIDI controller is in an offline state.

As a preferred embodiment of the present disclosure, when encapsulating the normal MIDI messages to be sent out and the corresponding virtual MIDI port in the sysex exclusive messages, including:

the BLE MIDI controller obtains the MAC address list from the operation system and determines whether the normal MIDI messages to be sent out is included in the MAC address list.

As a preferred embodiment of the present disclosure, when encapsulating the normal MIDI messages to be sent out and the corresponding virtual MIDI port in the sysex exclusive messages, further including:

when it is determined that the normal MIDI messages to be sent out is included in the MAC address list, the sysex exclusive messages and the virtual MIDI port corresponding to the normal MIDI messages are extracted from the MAC address list, and the normal MIDI messages and the virtual MIDI port are encapsulated in the sysex exclusive messages;

wherein, each sysex exclusive messages corresponds respectively to a functional area of the BLE MIDI controller, and corresponds to a MIDI messages sent out by the functional area.

A system for achieving BLE MIDI controller instruction control based on a virtual MIDI port, comprising:

a virtual port creation unit: it is used carrying out a port simulation on an operation system, and creating a plurality of virtual MIDI ports;

a connection state detection unit: it is used when it is detected that a BLE MIDI controller is connected to the operation system, the virtual MIDI port is automatically allocated to a connected BLE MIDI controller, and a connection state of the BLE MIDI controller is detected in real time;

an encapsulation unit: it is used the BLE MIDI controller encapsulates a normal MIDI messages to be sent out and a corresponding virtual MIDI port in a sysex exclusive messages to obtain a corresponding functional sysex exclusive messages, and sends the functional sysex exclusive messages to a decoder; and a conversion and transmission unit: it is used the received function sysex exclusive messages is converted into the normal MIDI messages in real time through the decoder, and then the normal MIDI messages is immediately sent to the operation system through the corresponding virtual MIDI port, so that the instruction control of the BLE MIDI controller is completed.

Compared to the prior art, the beneficial effects of the present disclosure are shown below:

(1) efficient multi-port application: the present disclosure, through virtualization technology, brings efficient application to BLE MIDI controllers in complex music production scenarios, overcoming the port limitations of traditional BLE MIDI controllers;

(2) seamless data flow: the present disclosure effectively solves the problem of data conflicts, ensuring the continuity, quality, and synchronization of music output;

(3) simplified user experience: the automatic virtual port allocation mechanism of the present disclosure provides users with a simplified setup process, which greatly reduces the hassle of device configuration and use for users through a plug and play experience; and (4) portability: in addition to providing technical solutions, the present disclosure also saves the need for physical connections. Due to the convenience of wireless connections, the mobility and flexibility of MIDI controllers have been significantly improved, making them easy to use in various situations.

The present disclosure is described in further detail below in connection with the accompanying drawings and specific embodiments.

FIG. label explanation: 1. wired MIDI controller; 2. operation system; 3. BLE MIDI controller.

DETAILED DESCRIPTION OF THE EMBODIMENTS

Figure 1:
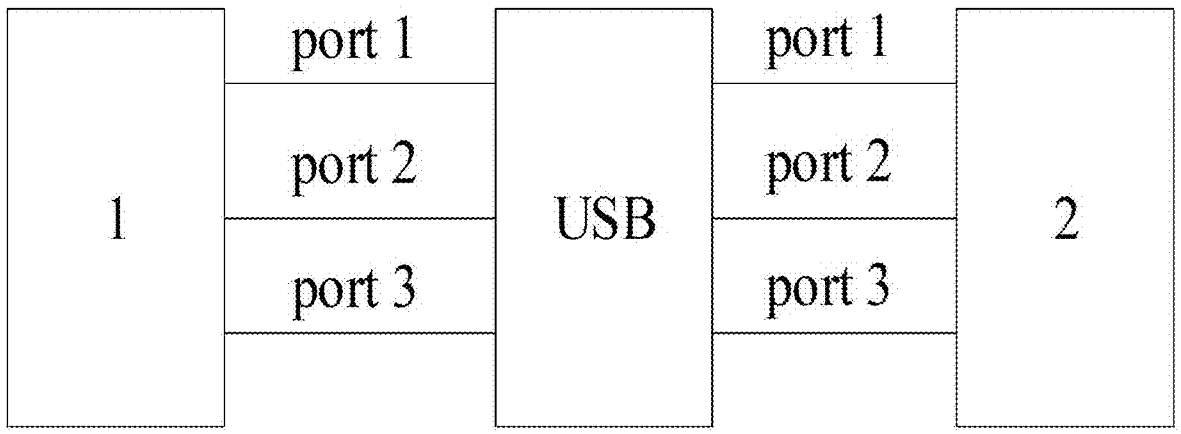
FIG. 1 is a schematic diagram of the interaction between a wired MIDI controller and an operation system of the background of the present disclosure.
Figure 2:
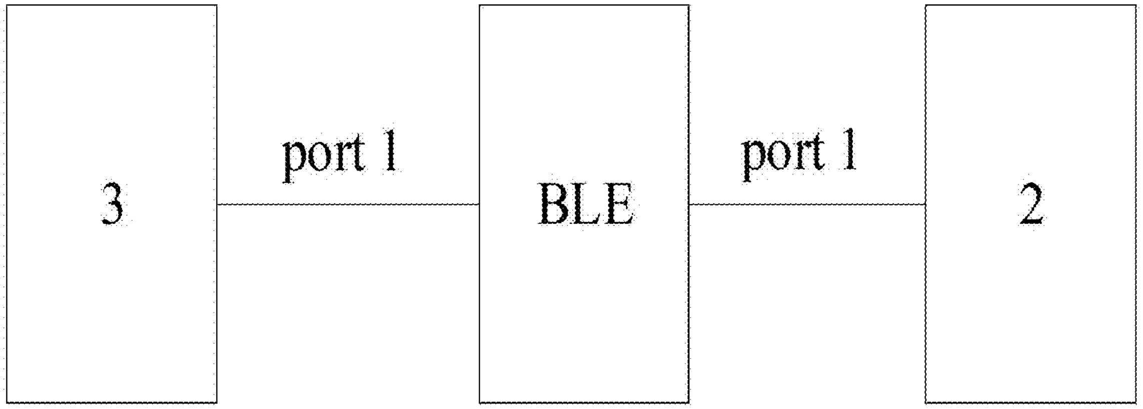
FIG. 2 is a schematic diagram of the interaction between a BLE MIDI controller and an operation system of the background of the present disclosure.
Figure 3:
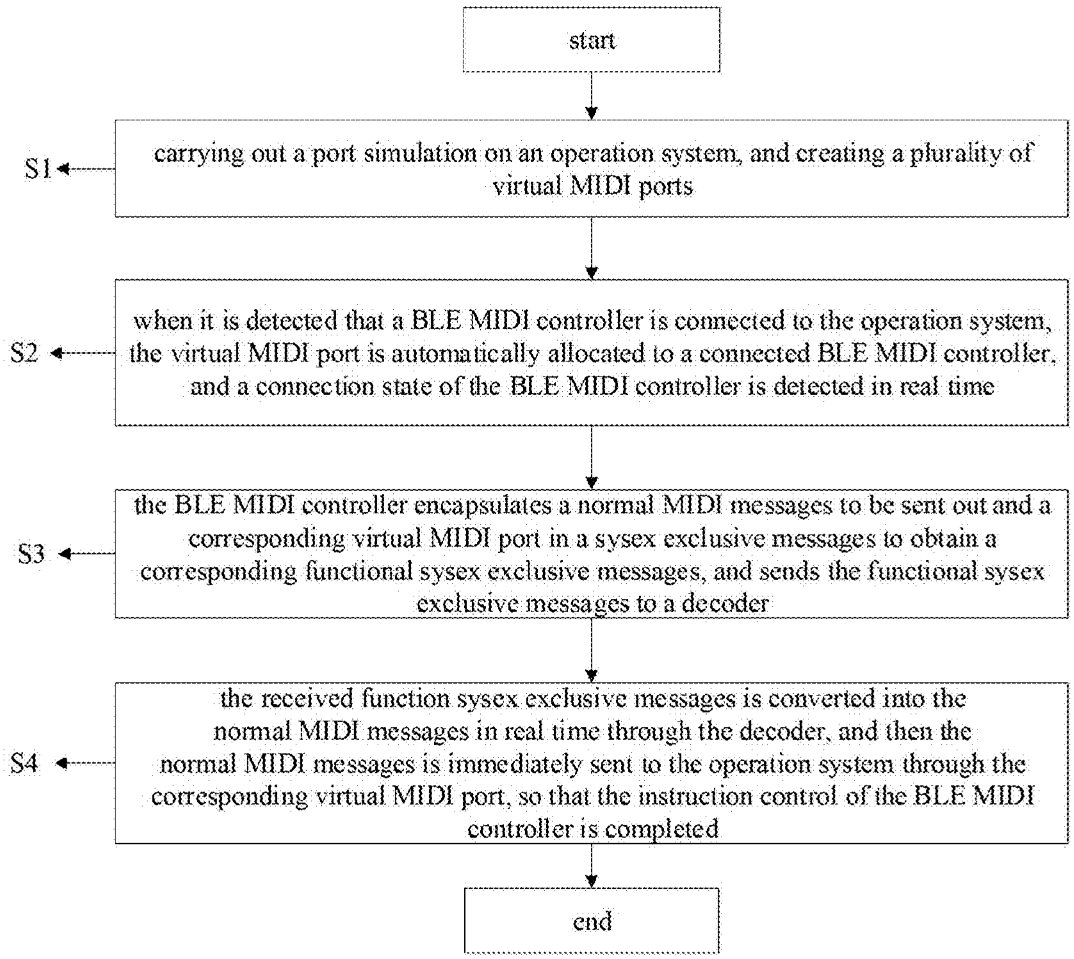
FIG. 3 is a method step diagram of achieving BLE MIDI controller instruction control based on a virtual MIDI port in an embodiment of the present disclosure.

The method for achieving BLE MIDI controller instruction control based on a virtual MIDI port provided by the present disclosure, as shown in FIG. 3, and the method comprises the following steps:

step 1: carrying out a port simulation on an operation system 2, and creating a plurality of virtual MIDI ports;

step 2: when it is detected that a BLE MIDI controller 3 is connected to the operation system 2, the virtual MIDI port is automatically allocated to a connected BLE MIDI controller 3, and the connection state of the BLE MIDI controller 3 is detected in real time;

step 3: the BLE MIDI controller encapsulates a normal MIDI messages to be sent out and a corresponding virtual MIDI port in a sysex exclusive messages to obtain a corresponding functional sysex exclusive messages, and sends the functional sysex exclusive messages to a decoder; and step 4: the received function sysex exclusive messages is converted into the normal MIDI messages in real time through the decoder, and then the normal MIDI messages is immediately sent to the operation system 2 through the corresponding virtual MIDI port, so that the instruction control of the BLE MIDI controller 3 is completed.

Figure 4:
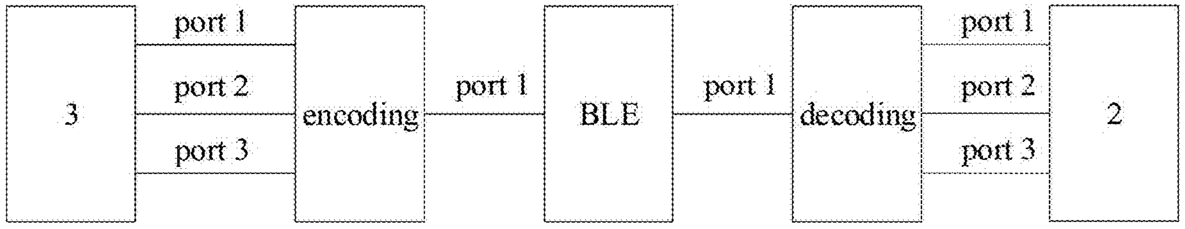
FIG. 4 is a schematic diagram of the interaction between a BLE MIDI controller based on a virtual MIDI port and an operation system in an embodiment of the present disclosure.

Based on the method provided by the present disclosure, the interaction between the BLE MIDI controller 3 and the operation system 2 is shown in FIG. 4.

Specifically, in step 1 above, the operation system 2 includes Macox and Windows.

In step 1 above, when carrying out a port simulation on an operation system 2, including:

connecting different BLE MIDI controllers 3 to the operation system 2 and obtaining a MAC addresses of the different BLE MIDI controllers 3 through the operation system 2.

In step 1 above, when creating a plurality of virtual MIDI ports, including:

creating corresponding virtual MIDI ports based on the existing virtual MIDI ports driver of the operation system 2 and the MAC address;

alternatively, based on the MAC address, creating corresponding virtual MIDI ports on the operation system 2 through an API;

after creating the corresponding virtual MIDI ports, including:

establishing a MAC address list between each virtual MIDI port and its corresponding MIDI messages, and the MAC address.

Specifically, the virtual MIDI port created by the present disclosure serves as an internal data channel within the system, allowing MIDI data to flow.

In step 2 above, when the virtual MIDI port is automatically allocated to the connected BLE MIDI controller 3, including:

one or a plurality of virtual MIDI ports are automatically allocated to the BLE MIDI controller 3 based on the MAC address of the connected BLE MIDI controller 3;

wherein, when automatically allocating based on the MAC addresses, including:

obtaining the MAC address of the BLE MIDI controller 3 and determining whether the MAC address is included in the MAC address list.

if so, obtain the corresponding virtual MIDI ports on the MAC address from the MAC address list and allocate it; and if not, prompt user to carry out the port simulation on the connected BLE MIDI controller 3, create the corresponding virtual MIDI ports, and update the MAC address list.

Specifically, the present disclosure achieves a plug and play effect through automatic allocation of the virtual MIDI ports.

In step 2 above, when the connection state of the BLE MIDI controller 3 is detected in real time, including:

obtaining a plurality of heartbeat packets data of the connected BLE MIDI controller 3 within a neighborhood time period at a current time, each of the heartbeat packets data contains a time information of the BLE MIDI controller 3 and an operation state information of the BLE MIDI controller 3;

the connection state of the BLE MIDI controller 3 is detected in real time based on the time information of the BLE MIDI controller 3 and the operation state information of the BLE MIDI controller 3;

wherein, the neighborhood time period contains two receiving moments, and the time information of the BLE MIDI controller 3 includes a device time of the BLE MIDI controller 3.

Furthermore, when real time detection is carried out based on the two receiving moments, including:

obtaining the time information of the BLE MIDI controller 3 and the operation state information of the BLE MIDI controller 3 in the heartbeat packets data corresponding to the two receiving moments, further obtaining a difference between the device time of the BLE MIDI controller 3 corresponding to the two receiving moments, and recording it as a first difference;

obtaining a difference between the device time of the BLE MIDI controller 3 in a target heartbeat packets data and the current time in a time zone where the BLE MIDI controller 3 is located, and recording it as a second difference; and the connection state of the BLE MIDI controller 3 is detected in real time based on the first difference, the second difference, and the operation state information of the BLE MIDI controller 3 in the target heartbeat packets data.

Furthermore, when real time detection is carried out based on the target heartbeat packets data, including:

determining whether the BLE MIDI controller 3 is operating normally based on the operation state information of the BLE MIDI controller 3 in the target heartbeat packets data;

if not, it is considered that the BLE MIDI controller 3 is in an offline state; and if so, further determine whether the first difference and the second difference are both less than a preset time difference; if so, it is considered that the BLE MIDI controller 3 is in the online state; if not, it is considered that the BLE MIDI controller 3 is in the offline state.

In step 3 above, when encapsulating the normal MIDI messages to be sent out and the corresponding virtual MIDI port in the sysex exclusive messages, including:

the BLE MIDI controller 3 obtains the MAC address list from the operation system 2 and determines whether the normal MIDI messages to be sent out is included in the MAC address list.

In step 3 above, when encapsulating the normal MIDI messages to be sent out and the corresponding virtual MIDI port in the sysex exclusive messages, further including:

when it is determined that the normal MIDI messages to be sent out is included in the MAC address list, the sysex exclusive messages and the virtual MIDI port corresponding to the normal MIDI messages are extracted from the MAC address list, and the normal MIDI messages and the virtual MIDI port are encapsulated in the sysex exclusive messages;

wherein, each sysex exclusive messages corresponds respectively to a functional area of the BLE MIDI controller 3, and corresponds to a MIDI messages sent out by the functional area.

Specifically, the functional area of the BLE MIDI controller 3 includes: piano keys, impact pads, knobs, etc. The MIDI codes included in the above normal MIDI messages are existing MIDI codes, comprising commonly used MIDI Note On, Note Off, Pitch Bend, and MIDI CC codes. The present disclosure encapsulates the normal MIDI messages by using the sysex exclusive messages different from existing MIDI messages, thereby avoiding usage conflicts with existing MIDI messages, ensuring the uniqueness of data, and improving transmission efficiency.

Specifically, various operations on BLE MIDI controller 3, such as pressing keys, striking impact pads, or rotating knobs, will be converted into normal MIDI messages by an internal circuit of the BLE MIDI controller 3. The present disclosure encapsulates the normal MIDI messages output by the BLE MIDI controller 3 using the sysex exclusive messages, which have a one-to-one correspondence with the functional areas of the BLE MIDI controller 3, thereby ensuring the uniqueness and accuracy of data.

Specifically, in step 4 above, the decoder determines whether to process the functional sysex exclusive messages by obtaining a second and third bit of the functional sysex exclusive messages sent by the BLE MIDI controller 3. If so, the normal MIDI messages encapsulated in it are extracted and sent through the corresponding virtual MIDI port. The MIDI code contained in the extracted normal MIDI messages includes the CC code commonly used in knobs, as well as the Note code used in piano keys and impact pads.

Specifically, once the decoder of the present disclosure detects the functional sysex exclusive messages, it immediately converts it into the normal MIDI messages and sends it through the corresponding virtual MIDI port to ensure real time music production and control.

The system provided by the present disclosure for achieving BLE MIDI controller 3 instruction control based on a virtual MIDI port includes: a virtual port creation unit, a connection state detection unit, an encapsulation unit, and a conversion and transmission unit.

The virtual port creation unit: it is used carrying out a port simulation on an operation system 2, and creating a plurality of virtual MIDI ports.

The connection state detection unit: it is used when it is detected that a BLE MIDI controller 3 is connected to the operation system, the virtual MIDI port is automatically allocated to a connected BLE MIDI controller 3, and the connection state of the BLE MIDI controller 3 is detected in real time.

The encapsulation unit: it is used the BLE MIDI controller encapsulates a normal MIDI messages to be sent out and a corresponding virtual MIDI port in a sysex exclusive messages to obtain a corresponding functional sysex exclusive messages, and sends the functional sysex exclusive messages to a decoder.

The conversion and transmission unit: it is used the received function sysex exclusive messages is converted into the normal MIDI messages in real time through the decoder, and then the normal MIDI messages is immediately sent to the operation system through the corresponding virtual MIDI port, so that the instruction control of the BLE MIDI controller is completed.

The above embodiments are only preferred embodiments of the present disclosure and cannot be used to limit the scope of protection of the present disclosure, and any non-substantial changes or substitutions made by those skilled in the art on the basis of the present disclosure fall within the scope of the claimed protection of the present disclosure.

What is claimed is:

1. A method for achieving Bluetooth Low Energy Musical Instrument Digital Interface (BLE MIDI) controller instruction control based on a virtual Musical Instrument Digital Interface (MIDI) port, and the method comprises the following steps:

carrying out a port simulation on an operation system, and creating a plurality of virtual MIDI ports;

when it is detected that a BLE MIDI controller is connected to the operation system, the virtual MIDI port is automatically allocated to a connected BLE MIDI controller, and a connection state of the BLE MIDI controller is detected in real time;

the BLE MIDI controller encapsulates normal MIDI messages to be sent out and a corresponding virtual MIDI port in sysex exclusive messages to obtain corresponding functional sysex exclusive messages, and sends the functional sysex exclusive messages to a decoder; and the received function sysex exclusive messages are converted into the normal MIDI messages in real time through the decoder, and then the normal MIDI messages are immediately sent to the operation system through the corresponding virtual MIDI port, so that the instruction control of the BLE MIDI controller is completed;

the connection state of the BLE MIDI controller is detected in real time, including:

obtaining a plurality of heartbeat packets data of the connected BLE MIDI controller within a neighborhood time period at a current time, each of the heartbeat packets data contains a time information of the BLE MIDI controller and an operation state information of the BLE MIDI controller;

the connection state of the BLE MIDI controller is detected in real time based on the time information of the BLE MIDI controller and the operation state information of the BLE MIDI controller;

wherein, the neighborhood time period contains two receiving moments, and the time information of the BLE MIDI controller includes a device time of the BLE MIDI controller.

2. The method for achieving BLE MIDI controller instruction control based on the virtual MIDI port according to claim 1, wherein when carrying out the port simulation on the operation system, including:

connecting different BLE MIDI controllers to the operation system and obtaining a Media Access Control (MAC) addresse of the different BLE MIDI controllers through the operation system.

3. The method for achieving BLE MIDI controller instruction control based on the virtual MIDI port according to claim 2, wherein when creating a plurality of virtual MIDI ports, including:

creating corresponding virtual MIDI ports based on the existing virtual MIDI ports driver of the operation system and the MAC address;

alternatively, based on the MAC address, creating corresponding virtual MIDI ports on the operation system through an API;

after creating the corresponding virtual MIDI ports, including:

establishing a MAC address list between each virtual MIDI port and its corresponding MIDI messages, and the MAC address.

4. The method for achieving BLE MIDI controller instruction control based on the virtual MIDI port according to claim 3, wherein when the virtual MIDI port is automatically allocated to the connected BLE MIDI controller, including:

one or a plurality of virtual MIDI ports are automatically allocated to the BLE MIDI controller based on the MAC address of the connected BLE MIDI controller;

wherein, when automatically allocating based on the MAC addresses, including:

obtaining the MAC address of the BLE MIDI controller and determining whether the MAC address is included in the MAC address list;

if so, obtain the corresponding virtual MIDI ports on the MAC address from the MAC address list and allocate it; and if not, prompt user to carry out the port simulation on the connected BLE MIDI controller, create the corresponding virtual MIDI ports, and update the MAC address list.

5. The method for achieving BLE MIDI controller instruction control based on the virtual MIDI port according to claim 1, wherein when real time detection is carried out based on the two receiving moments, including:

obtaining the time information of the BLE MIDI controller and the operation state information of the BLE MIDI controller in the heartbeat packets data corresponding to the two receiving moments, further obtaining a difference between the device time of the BLE MIDI controller corresponding to the two receiving moments, and recording it as a first difference;

obtaining a difference between the device time of the BLE MIDI controller in a target heartbeat packets data and the current time in a time zone where the BLE MIDI controller is located, and recording it as a second difference; and the connection state of the BLE MIDI controller is detected in real time based on the first difference, the second difference, and the operation state information of the BLE MIDI controller in the target heartbeat packets data.

6. The method for achieving BLE MIDI controller instruction control based on the virtual MIDI port according to claim 5, wherein when real time detection is carried out based on the target heartbeat packets data, including:

determining whether the BLE MIDI controller is operating normally based on the operation state information of the BLE MIDI controller in the target heartbeat packets data;

if not, it is considered that the BLE MIDI controller is in an offline state; and if so, further determine whether the first difference and the second difference are both less than a preset time difference; if so, it is considered that the BLE MIDI controller is in the online state; if not, it is considered that the BLE MIDI controller is in the offline state.

7. The method for achieving BLE MIDI controller instruction control based on the virtual MIDI port according to claim 3, wherein when encapsulating the normal MIDI messages to be sent out and the corresponding virtual MIDI port in the sysex exclusive messages, including:

the BLE MIDI controller obtains the MAC address list from the operation system and determines whether the normal MIDI messages to be sent out is included in the MAC address list.

8. The method for achieving BLE MIDI controller instruction control based on the virtual MIDI port according to claim 7, wherein when encapsulating the normal MIDI messages to be sent out and the corresponding virtual MIDI port in the sysex exclusive messages, further including:

when it is determined that the normal MIDI messages to be sent out is included in the MAC address list, the sysex exclusive messages and the virtual MIDI port corresponding to the normal MIDI messages are extracted from the MAC address list, and the normal MIDI messages and the virtual MIDI port are encapsulated in the sysex exclusive messages; and wherein, each sysex exclusive messages corresponds respectively to a functional area of the BLE MIDI controller, and corresponds to a MIDI messages sent out by the functional area.

* * * * *